MAGNETIC DATA RECORDING SYSTEM

Filed Aug. 14, 1957

5 Sheets-Sheet 1

INVENTOR
WILLIAM WEST MOE
BY
Brumbaugh, Free, Graves & Donohue
HIS ATTORNEYS

INVENTOR
WILLIAM WEST MOE
BY
Brumbaugh, Free, Graves & Donohue
HIS ATTORNEYS

INVENTOR
WILLIAM WEST MOE
BY
Brumbaugh, Free, Graves & Donohue
HIS ATTORNEYS

Oct. 22, 1963 W. W. MOE 3,108,265

MAGNETIC DATA RECORDING SYSTEM

Filed Aug. 14, 1957 5 Sheets-Sheet 4

INVENTOR
WILLIAM WEST MOE
BY
Brumbaugh, Free, Graves & Donohue
HIS ATTORNEYS

INVENTOR
WILLIAM WEST MOE
BY
Brumbaugh, Free, Graves & Donohue
HIS ATTORNEYS

United States Patent Office 3,108,265
Patented Oct. 22, 1963

3,108,265

MAGNETIC DATA RECORDING SYSTEM

William West Moe, Stratford, Conn., assignor to Time, Incorporated, New York, N.Y., a corporation of New York Filed Aug. 14, 1957, Ser. No. 678,132
7 Claims. (Cl. 340—345)

The invention relates to magnetic data recording systems and, more particularly, to a system for recording and reproducing information represented by a binary code.

The magnetic storage of coded information is often accomplished by recording a single positive or negative pulse corresponding to each information bit in the code. However, in such systems, direct current recording and reproducing circuits are required, making it impossible to separate the circuit noise from the information signals. In the present invention, utilization of a positive and negative pulse pair representing each information bit permits the signal to be carried by alternating current amplifiers capable of increasing the signal-to-noise ratio.

It is an object of this invention, accordingly, to provide a new and improved magnetic data recording system wherein each information bit is represented by a positive and negative pulse pair.

Another object of the invention is to provide transistorized recording and reproducing circuits for use in data recording systems of the above character.

A further object of the invention is to provide a transistorized multivibrator adapted for use with circuits utilizing positive and negative pulse pairs of the above character.

These and other objects of the invention are attained by applying a sequence of clock signals spaced at unit time intervals to two multivibrators, the first providing a voltage pulse in response to each clock signal and the second generating another voltage pulse immediately thereafter, and combining the two pulses in opposed voltage relation. Another signal occurring simultaneously with a clock signal to represent a different condition actuates two more multivibrators to generate a pair of information pulses at a time intermediate between clock signals. The information pulses are combined with the clock pulses and both pairs are recorded on a magnetic medium such as wire, for example, to produce a record wherein one condition is represented by a single pair of sequential positive and negative voltage pulses and another condition is represented by two successive pairs of such pulses within a unit time interval. Reproduction of the recorded information is accomplished by differentiating each recorded pulse pair to produce a signal representative of the change in voltage, clipping the differentiated signal and combining the clipped signal with another pulse to separate the clock signals from the information signals.

Further objects and advantages of the invention will be apparent from a reading of the following description taken in conjunction with the accompanying drawings in which.

Figure 2:
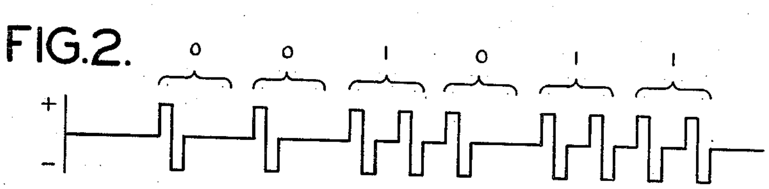
FIG. 2 illustrates the wave forms of a series of pulses representing each of two conditions of a binary code.
Figures 4, 4A:
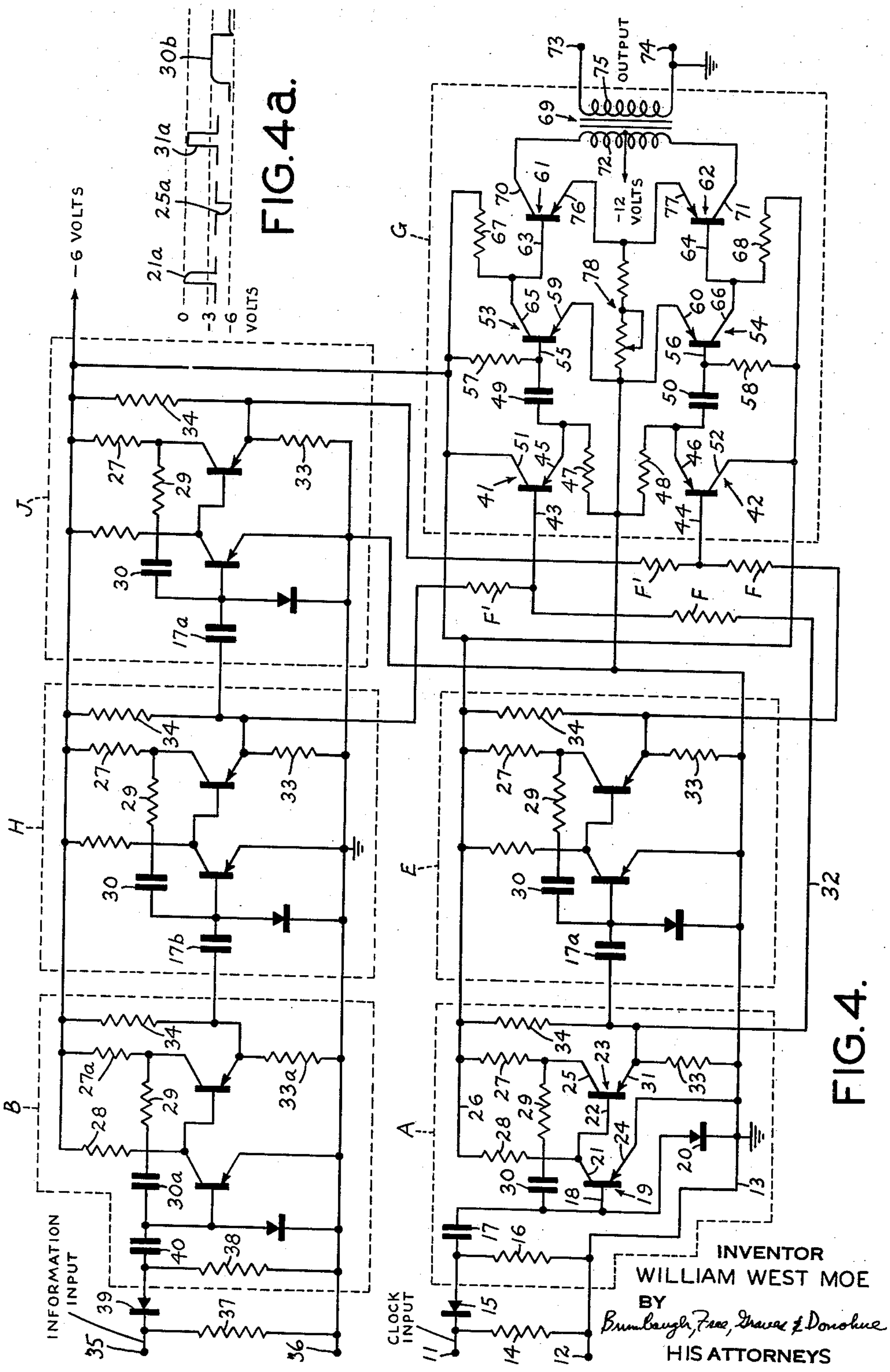
Figure 5:
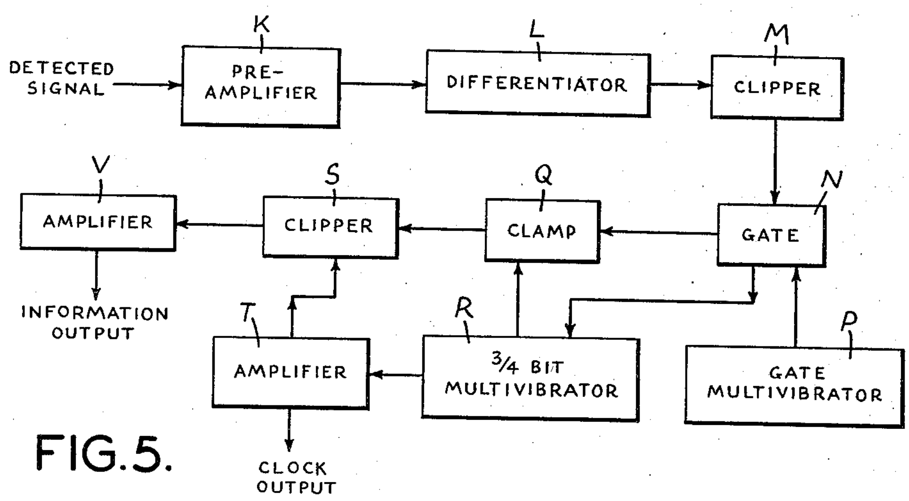
Figures 7, 7A:
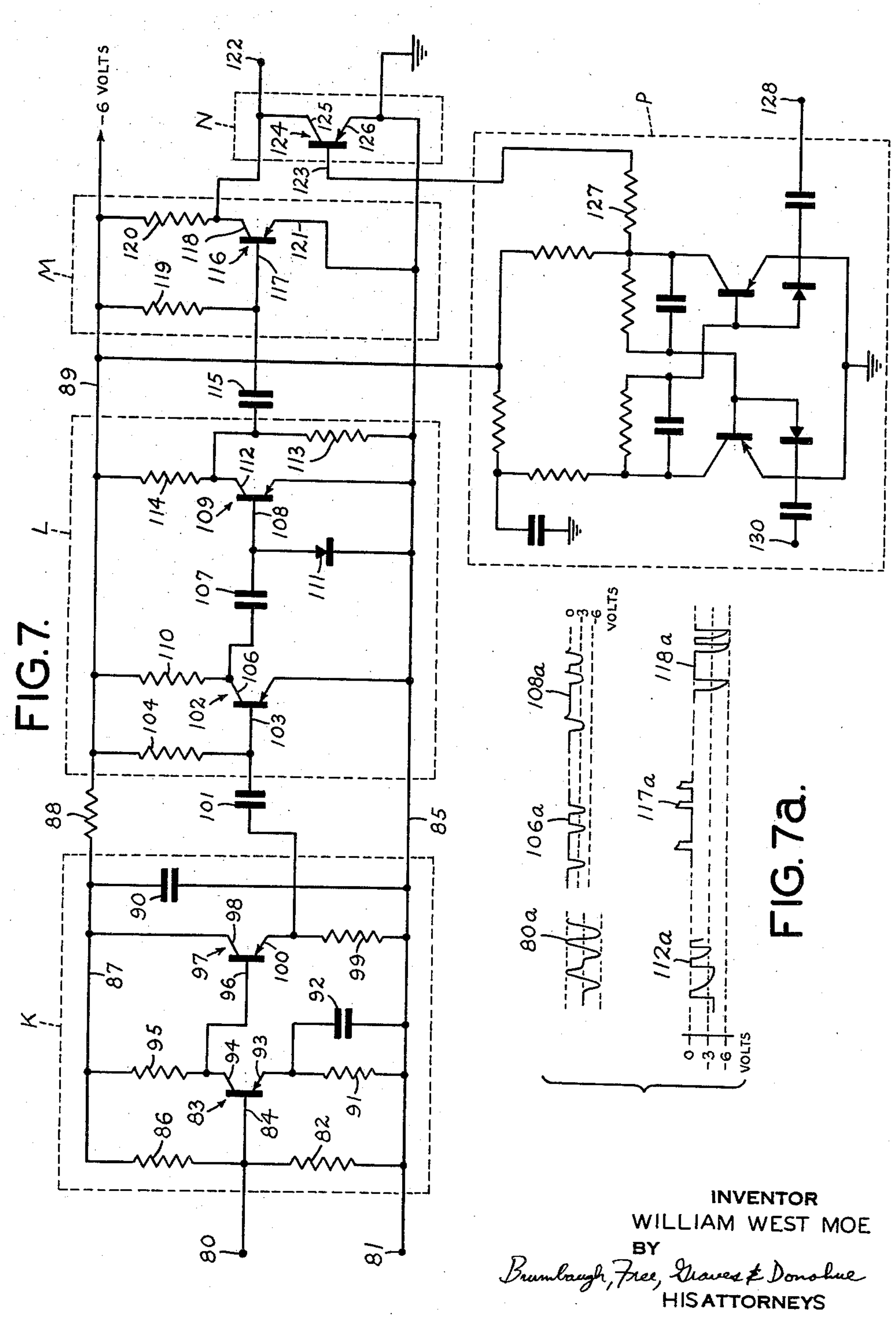
Figure 8:
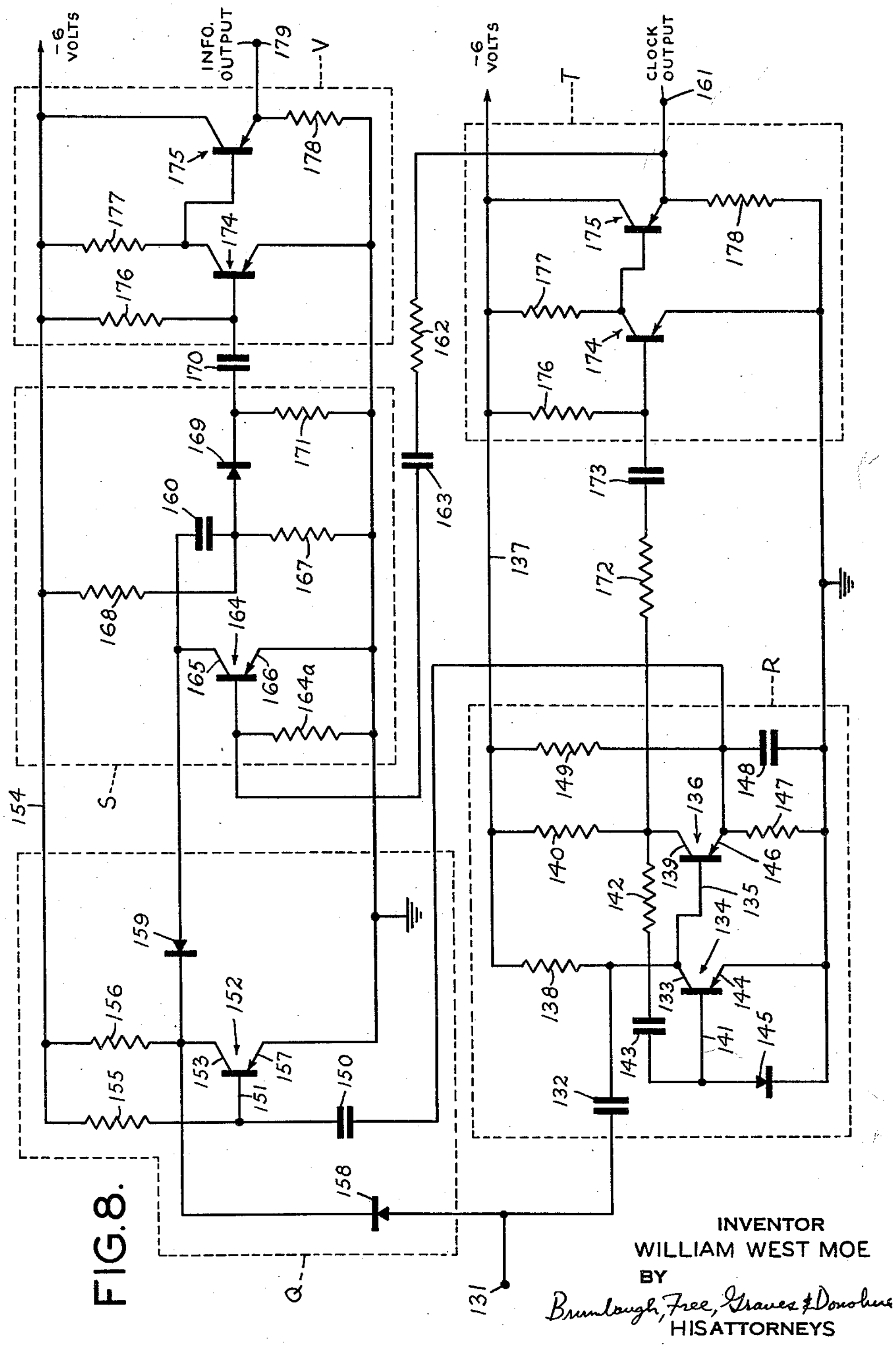

FIGS. 3*a* to 3*f* show the pulse signals which are combined to produce the wave forms illustrated in FIG. 2;

FIG. 4 is a schematic illustration of a circuit for recording information according to the invention;

FIG. 4*a* illustrates the wave form of pulse signals at various points of the circuit of FIG. 4;

FIG. 5 is a block diagram showing the arrangement of a reproducing circuit according to the invention;

FIGS. 6*a* to 6*e* show the wave forms of pulse signals at various stages during the reproduction of recorded information;

FIG. 7 is a schematic diagram illustrating a portion of a typical circuit for reproducing the recorded information according to the invention;

FIG. 7*a* illustrates the wave form of signals at certain points in the circuit of FIG. 7; and FIG. 8 illustrates schematically another portion of the reproducing circuit.

Figure 1:
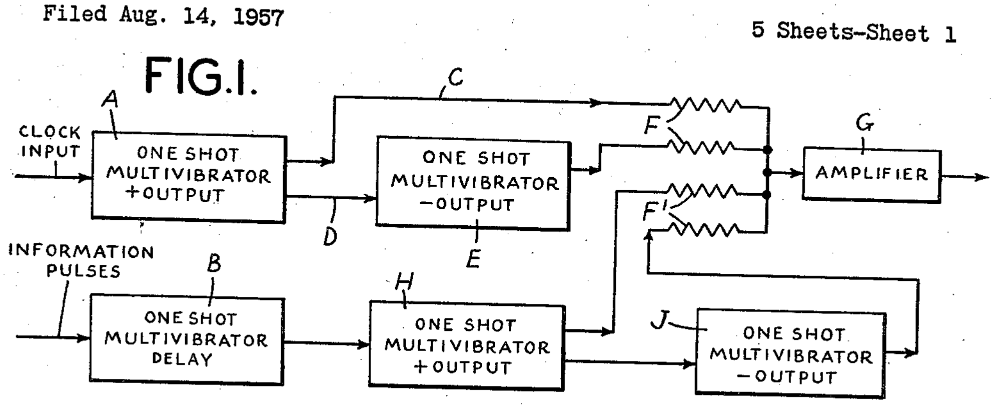
FIG. 1 is a block diagram illustrating a typical recording system arranged according to the invention.

In the block diagram of FIG. 1, a data recording system arranged according to the invention is shown wherein two one-shot multivibrators A and B are adapted to receive clock signals and information signals, respectively, in timed relation. As illustrated in FIG. 2, each clock signal produces a pair of positive and negative pulses occurring in sequence and an information signal occurring simultaneously with a clock signal generates another pulse pair which is combined with the clock pulses immediately thereafter. Clock signals occurring in the absence of information signals represent a "zero" condition and the presence of an information signal with a clock signal indicates a "one" condition.

In order to produce pulses in this manner, the clock input actuates the multivibrator A to generate a series of positive pulses, as shown in FIG. 3*a*, which is applied to the lines C and D. Another multivibrator E is fired from the trailing edge of each of the pulses received on the line D to produce a series of negative pulses such as shown in FIG. 3*b*. By combining these pulses through the resistors F and the amplifier G, the clock signals shown as the "zero" condition in FIG. 2 are produced at the amplifier output. Meanwhile, information signals applied to the multivibrator B each induce a one-half bit pulse of the type shown in FIG. 3*c* which is applied to another pair of multivibrators H and J, the one-half bit pulse having a duration of one-half the time interval between the clock pulses. Actuation of the multivibrators H and J from the trailing edge of each of these signals produces a delayed pair of positive and negative pulses, as shown in FIGS. 3*d* and 3*e*, and these are combined through the resistors F' and the amplifier G to complete the desired pulse pattern, as shown in FIG. 3*f*.

A typical circuit adapted to operate in the manner described above is illustrated in FIG. 4 wherein the clock signals are applied through two terminals 11 and 12 to the multivibrator A, the latter terminal being connected to a ground conductor 13. The input circuit from the terminal 11 includes a resistor 14 connected to ground, a series diode 15, another grounded resistor 16 and a series input capacitor 17 which carries the clock signal to the base electrode 18 of a first transistor 19. Another diode 20 provides a low resistance current path to ground from the base 18. The signal appearing at the collector 21 of the transistor 19, represented by the wave form 21*a* in FIG. 4*a*, is carried to the base electrode 22 of a second transistor 23, the emitter 24 of the first transistor being grounded. Between the collector 25 of the second transistor and a negative conductor 26 a resistor 27 is connected, the first transistor collector 21 also being linked to the conductor 26 through another resistor 28. Signals having the wave form 25*a* as shown in FIG. 4*a* appear at the collector 25 and are passed to the first transistor base electrode through a series resistor 29 and capacitor 30. At the multivibrator output, the signal has a wave form 31*a*, as shown in FIG. 4*a*, and is transmitted from the second transistor emitter 31 through an input capacitor 17*a* to the multivibrator E and to the amplifier G through the line 32, two resistors 33 and 34 linking the emitter electrode 31 to the ground and the negative conductors, respectively.

Each of the other multivibrators B, E, H and J is arranged in a similar manner, the information signal input comprising two terminals 35 and 36, the latter being grounded, two resistors 37 and 38, a diode 39 and a capacitor 40. In each case, the value of the storage capacitor 30, 30*a*, determines the duration of the multivibrator output pulses. The storage capacitor 30*a* of the delay multivibrator B is selected to give a one-half bit delay pulse, as shown by the wave form 30*b* in FIG. 4*a*, and the other storage capacitors 30 are preferably identical and of lower capacitance in order to produce signals having a wave form 31*a* (FIG. 4*a*) at the mixing resistors F and F′.

Figure 3:
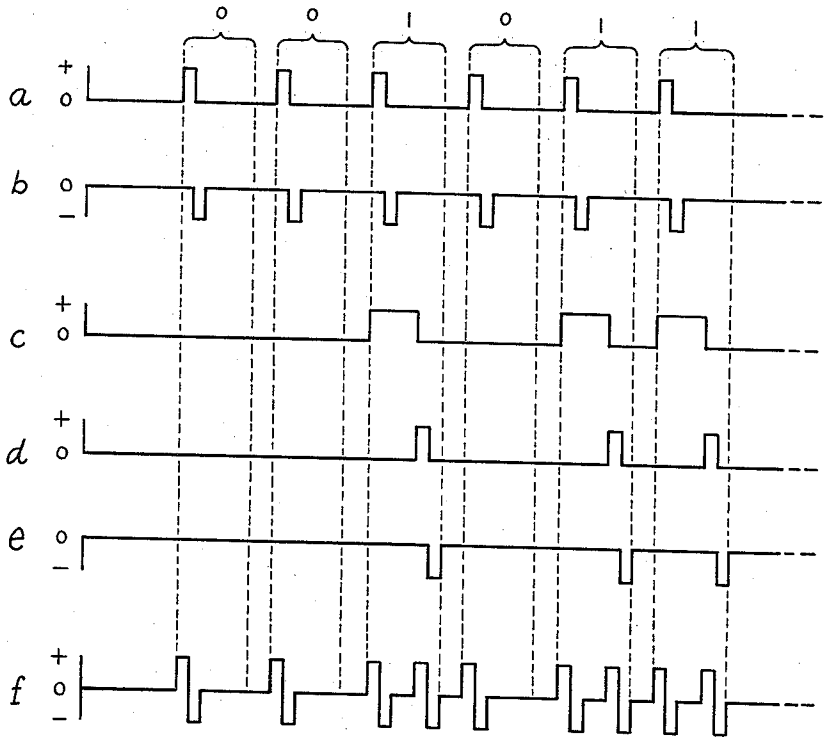

Although the multivibrator output pulses are represented for illustrative purposes in FIGS. 2 and 3 as being both positive and negative, it will be noted that the amplifier G is comprised of two input transistors 41 and 42 and that the multivibrators A and H apply positive pulses to the base electrode 43 of the transistor 41 while the multivibrators E and J send positive pulse signals to the base electrode 44 of the other transistor 42. The emitter electrodes 45 and 46 of these transistors are connected to ground through two resistors 47 and 48, respectively, and are linked to second amplifying stages through two capacitors 49 and 50, while the two collector electrodes 51 and 52 are connected to the negative conductor 26. In the second amplifying stages, two transistors 53 and 54 receive signals through their respective base electrodes 55 and 56 from the capacitors 49 and 50, their base electrodes also being connected to the negative conductor through two resistors 57 and 58, respectively, and their emitter electrodes 59 and 60 being grounded. The third amplifying stages comprise transistors 61 and 62 having base electrodes 63 and 64 linked to the collector electrodes 65 and 66 of the transistors in the preceding amplifying stages and to the negative conductor 26 through two resistors 67 and 68, respectively. An output transformer 69 having a negative center tap receives the signals from the collector electrodes 70 and 71 of the third stages at opposite ends of its primary coil 72, thus producing positive and negative pulses of the type described above which may be applied to a suitable magnetic recorder through two terminals 73 and 74 of a secondary coil 75. In order to adjust the amplifier gain, the emitter electrodes 76 and 77 of the third stages are connected together and to ground through a variable resistor 78.

Figure 6:
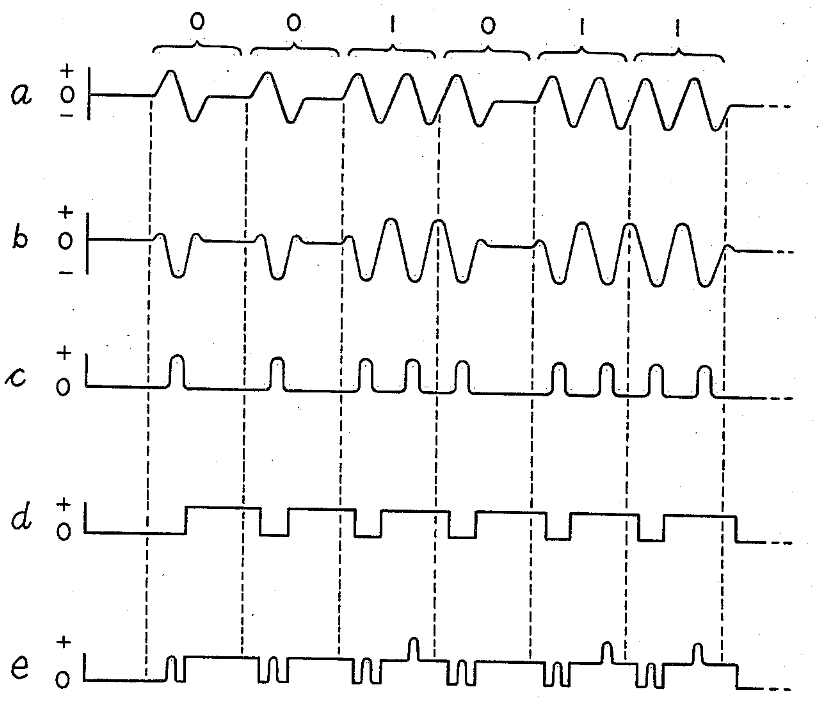

When the record is played back, the recorded information signal, which may have a wave form such as that shown in FIG. 6*a*, is transmitted from a suitable transducer (not shown) to a preamplifier K of the playback system illustrated in the block diagram of FIG. 5. After amplification, the signal is applied to a differentiator L which responds to the voltage variation of its input signal to produce a signal having a wave form such as that shown in FIG. 6*b*. This signal is then inverted and clipped by the clipper M to produce a series of single pulses as shown in FIG. 6*c*.

Inasmuch as a particular information record may be recorded at a predetermined location on a recording medium and, therefore, ought to be isolated from other signals when being played back, a gate N is provided in the playback system and this is controlled by a flip-flop type multivibrator P which is actuated according to the position of the reading device with respect to the magnetic record. This arrangement also permits preliminary acceleration of the recording medium before the playback system is turned on to reproduce the desired portion of the record.

The trailing edge of each of the clock pulse signals passed by the gate N actuates a three-quarter bit multivibrator R, producing a signal having a wave pattern similar to that shown in FIG. 6*d*, which is carried to a clamp Q and there combined with the signal from the gate N. It will be noted that the reproduced information pulses do not actuate the multivibrator P since they occur between the clock pulses and at times when the multivibrator is in the "on" condition.

As shown in FIG. 6*e*, the information pulses at the clamp Q occur at a higher voltage level than the clock pulses and thus the clock signals may be blanked out by the clipper S so that an amplifier V detects only the information pulses. Meanwhile, the trailing edge of each of the three-quarter bit pulses from the multivibrator P is applied to an amplifier T and this generates the clock output signals, which are also received by the clipper S to synchronize the information output with the clock output.

A typical embodiment of a playback apparatus arranged according to the invention is illustrated in FIGS. 7 and 8 wherein a detected record signal having a wave form 80*a* as shown in FIG. 7*a*, for example, is applied to the preamplifier K through two terminals 80 and 81. These signals are impressed across a resistor and passed to a transistor 83 through its base electrode 84, the terminal 81 being connected to a ground conductor 85. The base electrode 84 also receives negative potential from a resistor 86 which is connected to a preamplifier negative conductor 87 leading through a dropping resistor 88 to a primary negative conductor 89, the conductor 87 being connected to ground through a capacitor 90. A resistor 91 and a capacitor 92 joined in parallel connect the emitter electrode 93 of the transistor 83 to the ground conductor 85 and the collector electrode 94, which is linked to the conductor 87 through a resistor 95, applies signals to the base electrode 96 of a second transistor 97. The collector electrode 98 of this transistor is connected directly to the negative conductor 87 and the amplifier output signals appear across a resistor 99 which links the emitter electrode 100 with ground.

Amplified signals from the preamplifier K pass through an input capacitor 101 to the differentiator L where they are applied to a grounded-emitter transistor 102 through its base electrode 103 which is connected to the negative conductor 89 through a resistor 104. A signal thus produced at the collector 106 of the transistor 102, which is represented by the wave form 106*a* in FIG. 7*a*, passes through a capacitor 107 to the base 108 of another grounded-emitter transistor 109 where the signal has a wave form 108*a*, the collector 106 being connected to the negative conductor 89 through a resistor 110 and the base 108 having a low resistance path to ground through a diode 111. The differentiator output signal, represented in FIG. 7*a* by the wave form 112*a*, appears at a collector electrode 112 which has two resistors 113 and 114 connected to ground and to the negative conductor 89, respectively, and passes to the clipper M through a coupling capacitor 115.

Within the clipper M a transistor 116 has its base 117 and its collector 118 connected to the negative conductor 89 through two resistors 119 and 120, respectively, while its emitter electrode 121 is directly grounded. Signals applied to the base electrode 117 from the capacitor 115 are represented by the wave form 117*a* in FIG. 7*a* and produce pulses at the emitter 118 which are of the type designated by the numeral 118*a* in FIG. 7*a*.

During the time when recorded information is not being played back, the gate N is closed, preventing signals from passing to an output terminal 122, by applying negative voltage to the base electrode 123 of a gate transistor 124, thus creating a low resistance between the collector 125 and the emitter 126 thereof. Negative potential to accomplish this is obtained from the gate multivibrator P, which is a conventional flip-flop type adapted to control the potential at the base electrode 123 through a resistor 127 according to signals received through a starting terminal 128 and a stopping terminal 130.

Signals appearing at the terminal 122 are passed on to the multivibrator R and the clamp Q through a terminal 131 as seen in FIG. 8, the trailing edge of each clock pulse firing the multivibrator through an input capacitor 132. This capacitor is connected to the collector electrode 133 of a first transistor 134 and to the base electrode 135 of a second transistor 136 which also leads to the negative conductor 137 through a resistor 138. The collector electrode 139 of the transistor 136 is similarly connected to the negative conductor 137 through a resistor 140 and leads to the base electrode 141 of the transistor 134 through another resistor 142 and a capacitor 143. The emitter 144 of this transistor is grounded and a diode 145 provides a low resistance path from the base 141 to ground. As previously mentioned, this multivibrator generates a three-quarter bit width pulse and the capacitance of the capacitor 143 is selected to accomplish this. The pulse signal appears at the emitter electrode 146 of the transistor 136, which has a parallel resistor 147 and capacitor 148 leading to ground and a resistor 149 connected to the negative conductor 137.

Within the clamp Q an input capacitor 150 carries the multivibrator signal to the base electrode 151 of a transistor 152, the base electrode and a collector electrode 153 being connected to a negative conductor 154 through two resistors 155 and 156, respectively, while the emitter electrode 157 is grounded. The input terminal 131 also leads to the collector 153 through a diode 158 in the low resistance direction and the combined input and multivibrator signal passes through another diode 159 in the high resistance direction to the clipper S.

In order to synchronize the information and clock output signals, a storage capacitor 160 remains charged after receipt of each information signal until the next pulse from the clock output, transmitted through a series resistor 162 and capacitor 163, actuates a transistor 164, a resistor 164*a* being connected from the capacitor 163 to ground. This permits the capacitor 160 to discharge through a collector electrode 165 and a grounded-emitter electrode 166 of the transistor 164, the circuit from the capacitor being completed to ground through a resistor 167. Also connected to the junction of the capacitor 160 and the resistor 167 are a resistor 168, leading to the negative conductor 154, and a diode 169 providing a low resistance path to the amplifier V through a coupling capacitor 170, the junction of the diode 169 and the coupling capacitor being linked to ground by a resistor 171.

Meanwhile, the trailing edge of each pulse from the collector electrode 139 in the multivibrator R is carried to the amplifier T through a series resistor 172 and capacitor 173. The two amplifiers T and V are of the conventional type and may be identical in arrangement, each having a first grounded-emitter type transistor 174 and second grounded-collector type transistor 175, the base electrodes being connected to the negative conductors by resistors 176 and 177, respectively, and the output emitter being linked to ground through a resistor 178. After amplification, the synchronized clock and information signals appear at two output terminals 161 and 179, respectively, and may be applied to a suitable decoder to analyze the recorded data.

Except for the amplifier transistors 61 and 62 (FIG. 4) which may be of the 2N–186A type, for example, transistors of the type designated 2N–135 have been found suitable for use in both the recording and reproducing circuits. While it will be understood that the various circuit elements may be rearranged and the specific values of the components of the recording and reproducing systems may be varied according to the design for any particular application, the following values are typical and are included by way of example:

*Fig. 4*

| | | |
|---|---|---|
| Resistors 14, 37 | Ohms | 1,500 |
| Resistor 16 | do | 100,000 |
| Resistors 27, 67, 68 | do | 1,000 |
| Resistors 27*a*, 47, 48 | do | 3,300 |
| Resistors 28, F, F', 57, 58 | do | 10,000 |
| Resistors 29, 33 | do | 2,200 |
| Resistor 33*a* | do | 1,200 |
| Resistor 38 | do | 100,000 |
| Capacitors 17, 40 | Micromicrofarads | 50 |
| Capacitors 17*a* | do | 100 |
| Capacitors 17*b* | do | 250 |
| Capacitors 30 | do | 500 |
| Capacitors 30*a* | do | 1,500 |
| Capacitors 49, 50 | do | 20,000 |

*Fig. 7*

| | | |
|---|---|---|
| Resistors 82, 95, 99, 114 | Ohms | 10,000 |
| Resistor 86 | do | 22,000 |
| Resistor 88 | do | 820 |
| Resistors 91, 120 | do | 4,700 |
| Resistor 104 | do | 82,000 |
| Resistors 110, 127 | do | 8,200 |
| Resistor 113 | do | 18,000 |
| Resistor 119 | do | 39,000 |
| Capacitor 90 | Microfarads | 30 |
| Capacitor 92 | Micromicrofarads | 500,000 |
| Capacitor 101 | do | 100,000 |
| Capacitor 107 | do | 250 |
| Capacitor 115 | do | 1,000 |

*Fig. 8*

| | | |
|---|---|---|
| Resistor 138 | Ohms | 10,000 |
| Resistor 140 | do | 3,300 |
| Resistors 142, 147, 167, 171, 172, 177, 178 | do | 2,200 |
| Resistors 149, 155 | do | 47,000 |
| Resistors 156, 164*a* | do | 4,700 |
| Resistor 162 | do | 15,000 |
| Resistor 168 | do | 12,000 |
| Resistor 176 | do | 22,000 |
| Capacitor 132 | Micromicrofarads | 250 |
| Capacitor 143 | do | 2,500 |
| Capacitor 148 | do | 2,000 |
| Capacitors 150, 163, 170 | do | 5,000 |
| Capacitor 160 | do | 1,500 |
| Capacitor 173 | do | 500 |

While the invention has been described with respect to a single embodiment, many modifications and variations thereof will occur to those skilled in the art. Accordingly, the invention is not intended to be restricted in scope except as defined by the following claims.

I claim:

1. Apparatus for reproducing recorded information consisting of a timed series of clock signals, each indicating a first condition in the absence of other signals and a second condition when associated with an information signal recorded during an interval between clock signals comprising means for detecting the information signals independently of the clock signals and means for shifting the information signals with respect to the clock signals to reproduce each information signal simultaneously with its associated clock signal.

2. Apparatus for reproducing recorded information consisting of a timed series of clock signals, each indicating a first condition in the absence of other signals and a second condition when associated with an information signal recorded during an interval between clock signals comprising means for changing the voltage level of the information signals with respect to the clock signals, means for detecting the information signals independently of the clock signals, and means for shifting the information signals with respect to the clock signals to reproduce each information signal simultaneously with its associated clock signal.

3. Apparatus for reproducing recorded information consisting of a timed series of clock signals, each indicating a first condition in the absence of other signals and a second condition when associated with an information signal recorded during an interval between clock signals comprising means for generating a series of voltage signals coinciding with the intervals between clock signals, adding the voltage signals to the series of recorded signals to change the voltage level of the information signals with respect to the clock signals, means separating the clock and information signals, and means for shifting the clock and information signals with respect to each other to reproduce each information signal simultaneously with its associated clock signal.

4. Apparatus for reproducing recorded information consisting of a timed series of clock signals, each indicating a first condition in the absence of other signals and indicating a second condition when associated with an information signal having a waveform similar to that of the clock signals recorded during an interval between clock signals comprising means responsive to the recorded clock signals for generating voltage signals during the intervals between clock signals, means for combining the voltage signals with the recorded signals, clipper means for separating the information signals from the clock signals, delay means adapted to shift the temporal relation of the information signals with respect to the clock signals, an information output to which the separated information signals are applied, and a clock output to which the clock signals are applied.

5. Apparatus for reproducing recorded information consisting of a timed series of clock signals, each indicating a first condition in the absence of other signals and indicating a second condition when associated with an information signal having a waveform similar to that of the clock signals recorded during an interval between clock signals comprising means responsive to the recorded clock signals for generating voltage signals during the intervals between clock signals, means for combining the voltage signals with the recorded signals to change the voltage level of the information signals with respect to the clock signals, clipper means for separating the information signals from the clock signals, delay means adapted to synchronize each information signal with its associated clock signal, an information output to which the separated information signals are applied, and a clock output to which the clock signals are applied.

6. Apparatus for reproducing recorded information consisting of a timed series of clock signals, each including a positive pulse and a negative pulse and indicating a first condition in the absence of other signals and a second condition when associated with an information signal including a positive pulse and a negative pulse recorded during an interval between clock signals comprising a differentiator responsive to the voltage variation of each of the signals and adapted to produce a single pulse corresponding to each signal, means responsive to the recorded clock signals for generating a voltage signal during the intervals between clock signals, means for combining the voltage signals with the recorded signals to change the voltage level of the information signals with respect to the clock signals, clipper means for separating the information signals from the clock signals, delay means adapted to synchronize each information signal with its associated clock signal, an information output to which the separated information signals are applied and a clock output to which the clock signals are applied.

7. Apparatus for reproducing recorded information consisting of a timed series of clock signals, each including a positive pulse and a negative pulse and indicating a first condition in the absence of other signals and a second condition when associated with an information signal including a positive pulse and a negative pulse recorded during an interval between clock signals comprising a differentiator responsive to the voltage variation of each of the signals, a signal clipper responsive to the differentiated signals and adapted to produce a single pulse corresponding to each signal, a multivibrator responsive to each of the clock pulses and adapted to produce voltage signals during the intervals between clock signals, means for combining the voltage signals and the clipped signals so that the voltage level of the information signals with respect to the clock signals is changed, means for separating the information signals from the clock signals, a clock signal output terminal, an information signal output terminal, and delay means for storing information signals adapted to be triggered by each clock signal to produce synchronized signals at the clock and information output terminals.

References Cited in the file of this patent

UNITED STATES PATENTS

| | | |
|---|---|---|
| 2,692,379 | Toth | Oct. 19, 1954 |
| 2,757,286 | Wanlass | July 31, 1956 |
| 2,764,463 | Lubkin et al. | Sept. 25, 1956 |
| 2,787,514 | Albanes | Apr. 2, 1957 |
| 2,788,449 | Bright | Apr. 9, 1957 |
| 2,804,605 | De Turk | Aug. 27, 1957 |
| 2,807,797 | Shoemaker | Sept. 24, 1957 |
| 2,886,802 | Henning et al. | May 12, 1959 |
| 2,896,192 | Husman | July 21, 1959 |
| 2,936,444 | Hieken | May 10, 1960 |